US006857732B2

(12) United States Patent
Jones et al.

(10) Patent No.: US 6,857,732 B2
(45) Date of Patent: Feb. 22, 2005

(54) VISIBLE IDENTIFICATION OF SOLID INK STICK

(75) Inventors: Brent R. Jones, Tualatin, OR (US); Frederick T. Mattern, Portland, OR (US)

(73) Assignee: Xerox Corporation, Stamford, CT (US)

( * ) Notice: Subject to any disclaimer, the term of this patent is extended or adjusted under 35 U.S.C. 154(b) by 36 days.

(21) Appl. No.: 10/135,067

(22) Filed: Apr. 29, 2002

(65) Prior Publication Data

US 2003/0202076 A1 Oct. 30, 2003

(51) Int. Cl.[7] .......................... B41J 2/175; G01D 11/00
(52) U.S. Cl. ............................ 347/88; 347/99; 347/84; 347/85; 347/95
(58) Field of Search .................................... 347/88, 99

(56) References Cited

U.S. PATENT DOCUMENTS 5,223,860 A * 6/1993 Loofbourow et al. ......... 347/88
D346,821 S * 5/1994 Smith .......................... D18/56
5,510,821 A * 4/1996 Jones et al. .................. 347/88
D403,699 S * 1/1999 Chin et al. ................... D18/56
5,917,528 A 6/1999 Grellmann et al. ........... 347/88
5,975,688 A 11/1999 Kanaya et al. ................ 347/86
5,988,805 A * 11/1999 Meinhardt ................... 347/88
6,213,600 B1 4/2001 Kobayashi et al. ........... 347/86

* cited by examiner

*Primary Examiner*—Michael S Brooke
*Assistant Examiner*—Leonard Liang
(74) *Attorney, Agent, or Firm*—David J. Arthur

(57) ABSTRACT

Each ink stick of a set of ink sticks for a phase change ink jet printer has formed on the top of the ink stick a three dimensional visually recognizable symbol. At least a portion of the visually recognizable symbol on each of the ink sticks is different, so that the printer user can distinguish which ink stick is intended for each of the ink feed channels of the ink jet printer.

3 Claims, 9 Drawing Sheets

VISIBLE IDENTIFICATION OF SOLID INK STICK

CROSS-REFERENCE TO RELATED APPLICATIONS

Reference is made to commonly-assigned copending U.S. patent application Ser. No. 10/135,089 , filed concurrently herewith, entitled "Alignment Feature for Solid Ink Stick," by Jones et al., and U.S. patent application Ser. No. 10/135,034 , filed concurrently herewith, entitled "Solid Ink Stick with Identifiable Shape," by Jones, the disclosure(s) of which are incorporated herein.

The present invention relates generally to ink printers, the ink used in such ink printers, and the apparatus and method for feeding the ink into the printer.

BACKGROUND

Solid ink or phase change ink printers conventionally receive ink in a solid form, either as pellets or as ink sticks. A feed mechanism delivers the solid ink to a heater assembly, where the ink is melted into a liquid state for jetting onto a receiving medium.

Solid ink or phase change ink printers conventionally receive ink in a solid form and convert the ink to a liquid form for jetting onto a receiving medium. The printer receives the solid ink either as pellets or as ink sticks in a feed chute. With solid ink sticks, the solid ink sticks are either gravity fed or spring loaded through a feed channel of the feed chute toward a heater plate. The heater plate melts the solid ink into its liquid form In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

A set of ink sticks for use in a solid ink feed system of a phase change ink jet printer in which the solid ink feed system includes more than one feed channel, includes more than one ink sticks. Each ink stick is formed of an ink stick body with a top. A visually recognizable symbol is formed in the top of each ink stick body. At least a portion of the visually recognizable symbol on each ink stick is different, to establish correlation with a particular one of the feed channels of the solid ink feed system. Each visually recognizable symbol is formed with a vertical dimension on the top of the ink stick body.

THE DRAWINGS

DETAILED DESCRIPTION

Figure 1:
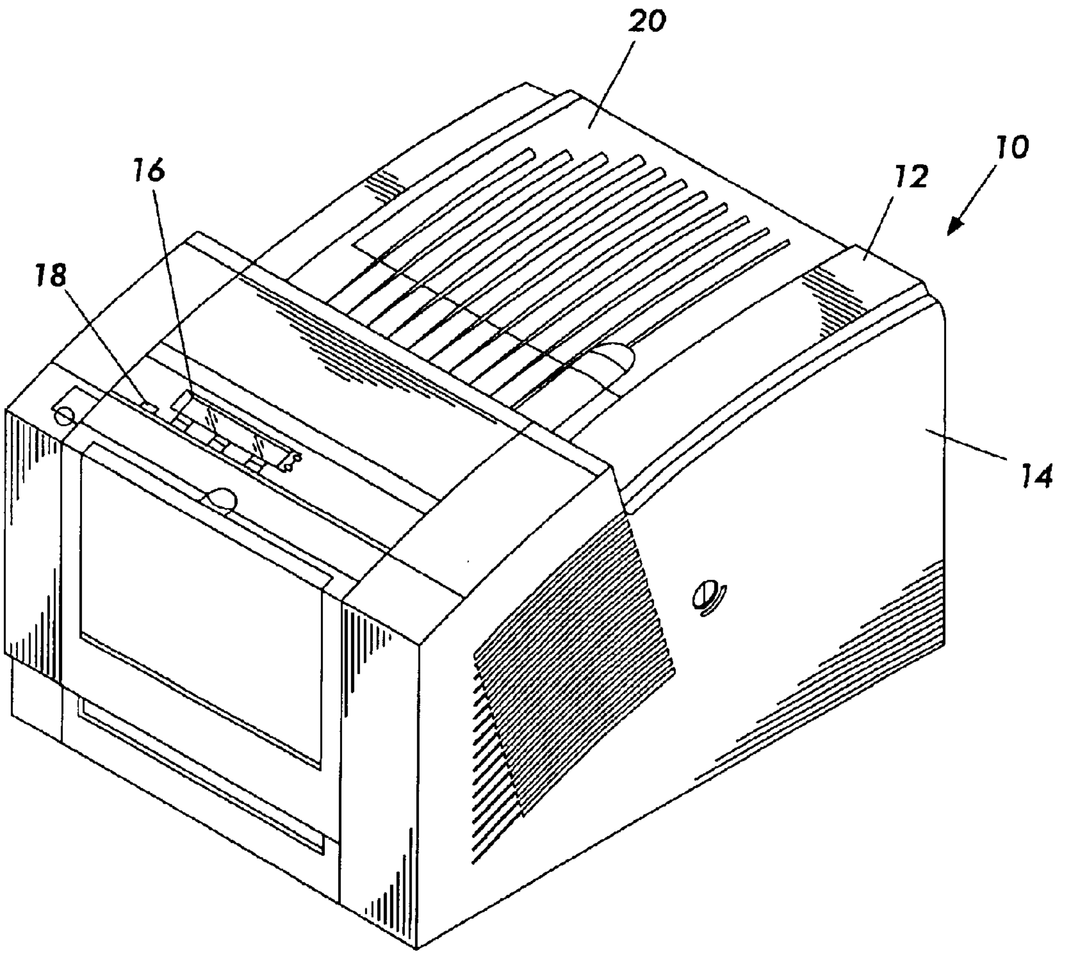
FIG. 1 is a perspective view of a phase change printer with the printer top cover closed.
Figure 2:
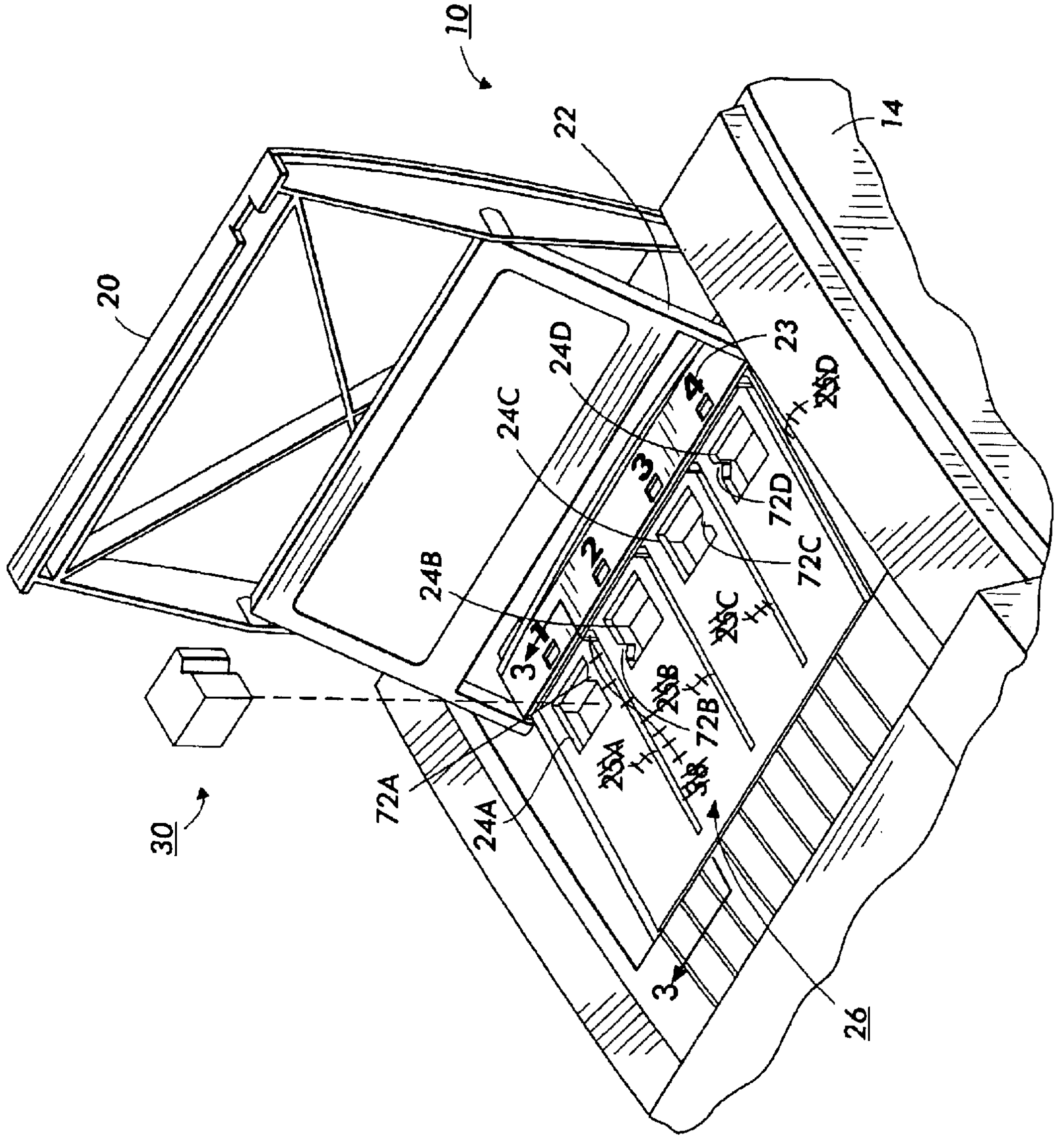
FIG. 2 is an enlarged partial top perspective view of the phase change printer with the ink access cover open, showing a solid ink stick in position to be loaded into a feed channel.

Referring first to FIG. 1, a solid ink, or phase change ink printer 10 includes an outer housing having a top surface 12 and side surfaces 14. A user interface, such as a front panel display screen 16 displays information concerning the status of the printer, and user instructions. Buttons 18 or other control elements may be adjacent the user interface window, or at other locations on the printer, to permit user interaction with the printer. The printing mechanism (not shown) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers solid ink to the printing mechanism. The ink feed system may be contained under the top surface of the housing. The top surface of the housing includes a hinged top cover 20 that opens to reveal the ink feed system, and shown in FIG. 2.

In the particular cover embodiment shown, the ink access cover 20 is attached to an ink load linkage 22 so that when the ink access cover 20 is raised, the ink load linkage 22 slides and pivots to an ink load position. The interaction of the ink access cover and the ink load linkage element is similar to that described in U.S. Pat. No. 5,861,903 for an Ink Feed System, issued Jan. 19, 1999 to Crawford et al. Opening the ink access cover 20 reveals a key plate 26 having keyed openings 24. The keyed openings provide access to a feed chute comprising several individual feed channels, represented by exemplary feed channel 28A. Each keyed opening provides access to an insertion end of one of the several individual feed channels of the solid ink feed system. A color printer typically uses four colors of ink (black, cyan, magenta, and yellow); Each color corresponds to one of the feed channels. In the illustrated embodiment, the key plate has four keyed openings 24A, 24B, 240, and 24D. Each keyed opening 24A, 24B, 24C, 24D of the key plate 26 has a unique shape. The ink sticks 30 of the color for that feed channel have a shape corresponding to the shape of the keyed opening 24. For example, the lateral sides of the key plate openings and the lateral sides of the ink sticks may have corresponding shapes. The keyed openings and corresponding ink stick shapes are designed to ensure that only ink sticks of the proper color are inserted into each ink stick feed channel. A visually recognizable symbol 23, such as a numeral, can be applied to or formed in the housing adjacent the keyed opening. This visually recognizable symbol aids the printer user in identifying particular keyed openings and their corresponding feed channels.

Figure 3:
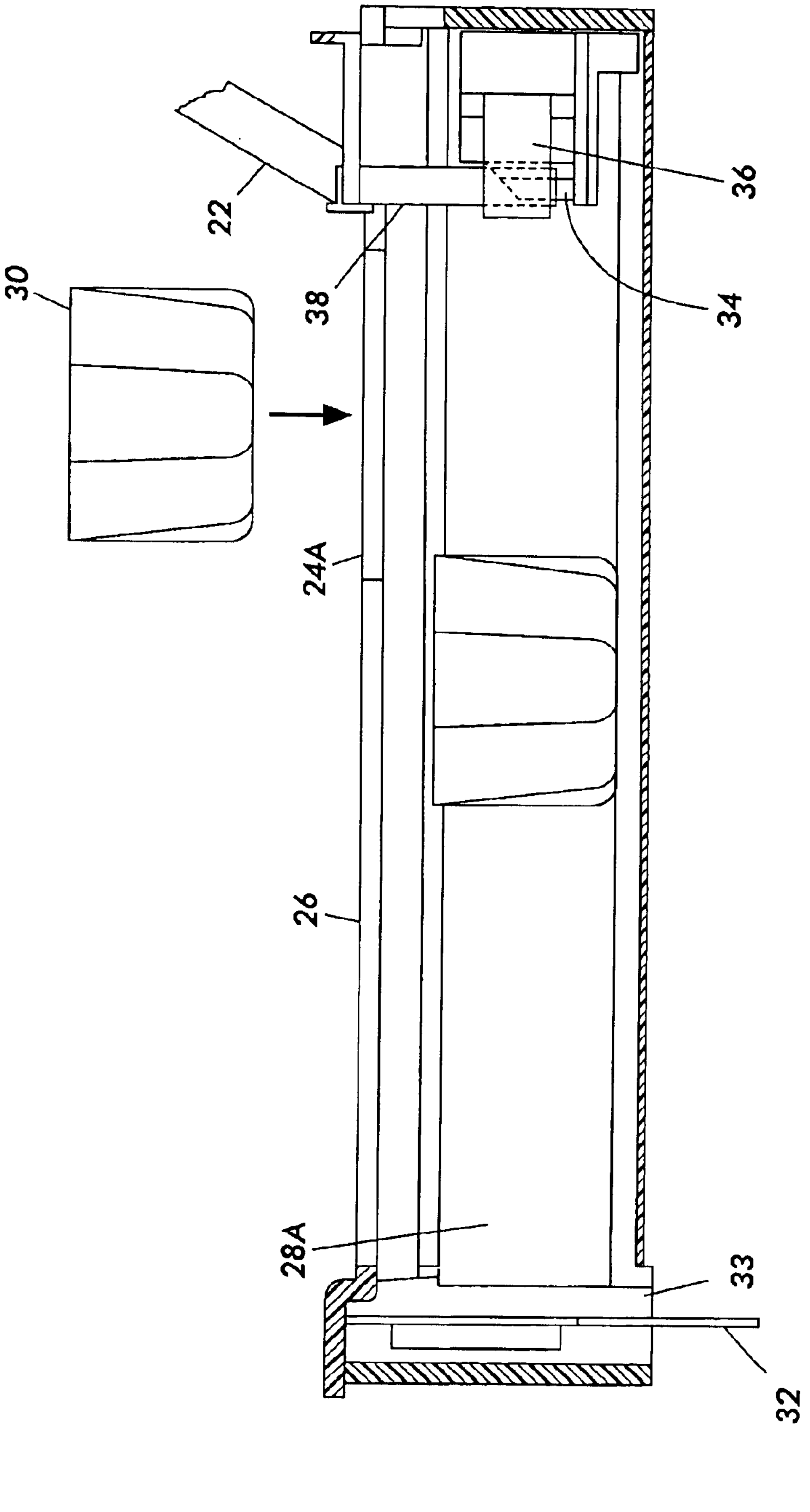
FIG. 3 is a side sectional view of a feed channel of a solid ink feed system, taken along line 3—3 of FIG. 2.

Referring to FIG. 3, each feed channel, such as representative feed channel 28A is a longitudinal feed channel designed to deliver ink sticks 30 of a particular color to a corresponding melt plate 32. Although the first feed channel 28A is shown in FIG. 3, all the feed channels are identical for purposes of the following description. Each feed channel in the particular embodiment illustrated includes a push block 34 driven by a constant force spring 36 to push the individual ink sticks 30 along the length of the longitudinal feed channel toward the melt plates 32 that are at the melt end of each feed channel. In the embodiment illustrated, the constant force spring 36 can be a flat spring with its face oriented along a substantially vertical axis.

The feed channel has a longitudinal dimension from the insertion end to the melt end, and a lateral dimension, substantially perpendicular to the longitudinal dimension. The feed channel receives ink sticks inserted at the insertion end. The feed channel has sufficient longitudinal length that multiple ink sticks can be inserted into the feed channel. Each feed channel delivers ink sticks along the longitudinal length or feed direction of the channel to the corresponding melt plate at the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown).

Figure 4:
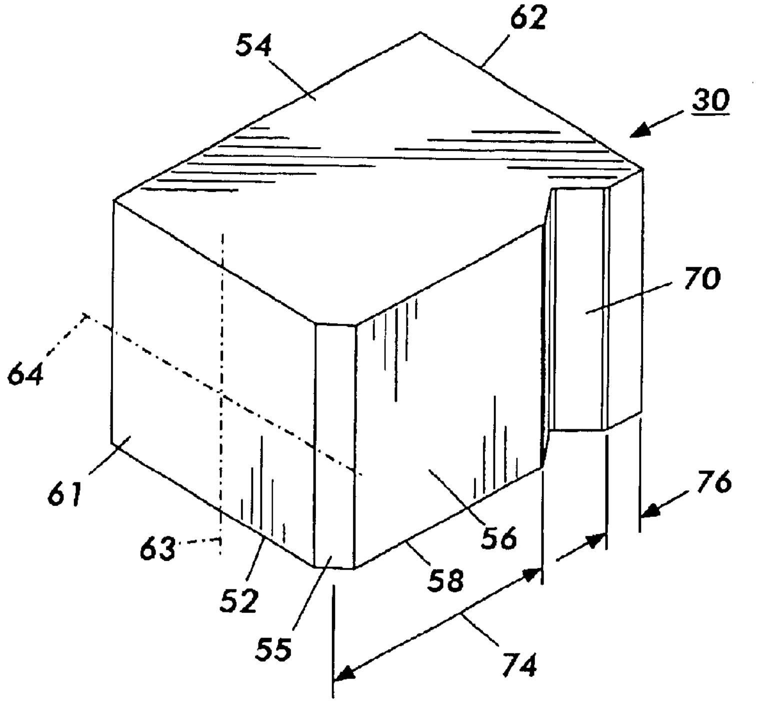
FIG. 4 is a perspective view of an embodiment of a solid ink stick.

An exemplary solid ink stick 30 for use in the feed system is illustrated in FIG. 4. The ink stick is formed of a three dimensional ink stick body. A substantially cubic ink stick body is illustrated in FIG. 4. The ink stick body illustrated has a bottom, represented by a general bottom surface 52, and a top, represented by a general top surface 54. The top and bottom surfaces are shown substantially parallel one another. However, the surfaces of the ink stick body need not be flat, nor need they be parallel or perpendicular one another. Nevertheless, these descriptions will aid the reader in visualizing, even though the surfaces may have three dimensional topography, or be angled with respect to one another. The ink stick body also has a plurality of side extremities, such as side surfaces 56, 61, 62. The illustrated embodiment includes four side surfaces, including two end surfaces 61, 62 and two lateral side surfaces 56. The lateral side surfaces 56 are substantially parallel one another, and are substantially perpendicular to the top and bottom surfaces 52, 54. The end surfaces 61, 62 are also substantially parallel one another, and substantially perpendicular to the top and bottom surfaces, and to the lateral side surfaces. The ink stick is configured to fit into the feed channel of the feed channel with the two lateral side surfaces 56 of the ink stick body oriented along the longitudinal feed direction of the feed channel. With the substantially cubic ink stick shape illustrated, the end surfaces are thus oriented along the transverse or lateral dimension of the feed channel. One of the end surfaces 61 is a front or leading end surface, and the other end surface 62 is a rear or trailing end surface. The bottom surface has lateral edges 58 at which the bottom surface 52 intersects the lateral side surfaces 56. The ink stick body may be formed by pour molding, injection molding, compression molding, or other known techniques.

Figure 5:
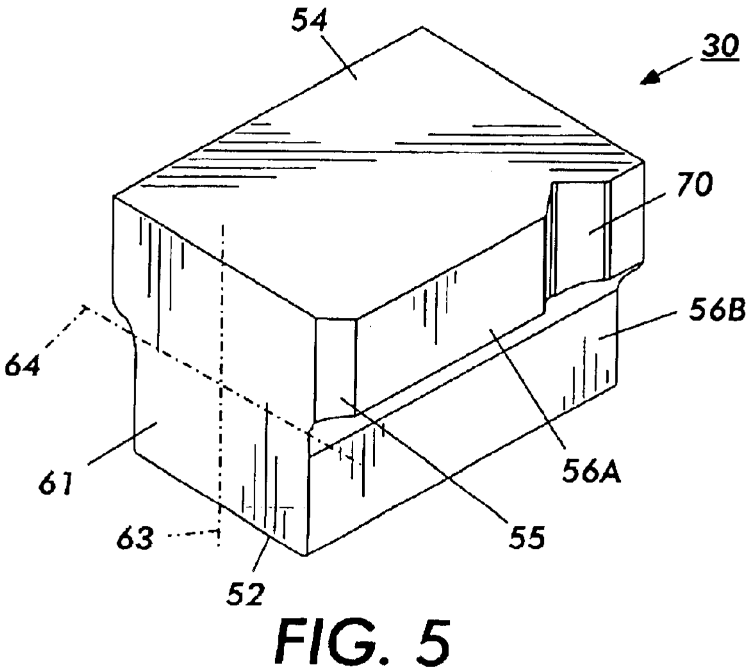
FIG. 5 is a perspective view of another embodiment of a solid ink stick.

The ink stick body can also be formed in any of numerous other shapes. FIG. 5 illustrates an embodiment of the ink stick body in which the lateral side surfaces 56 are stepped or segmented. In the particular embodiment illustrated, the lower portion of the body adjacent the bottom surface is narrower in the lateral dimension than the upper portion of the ink stick body adjacent the top surface. The lower portion of the ink stick body in the embodiment of FIG. 5 is approximately 5–30% narrower than the upper portion of the ink stick body.

The ink stick body has a lateral center of gravity 63 between the lateral side surfaces of the body, and a vertical center of gravity 64 between the top and bottom surfaces. If the ink stick body has a substantially uniform weight density, the lateral center of gravity is approximately midway between the lateral side surfaces 56 of the ink stick body.

The outermost lateral dimension of the ink stick body is only fractionally smaller than the lateral dimension of the ink stick feed channel 28A. For example, the ink stick body has a longitudinal dimension between the end surfaces, including keying features, of between approximately 0.8 and 2.0 inches (20–51 mm), such as 1.2 inch (30 mm). The ink stick body has a lateral dimension between the lateral extremities of between approximately 1.0 and 2.0 inches (25–51 mm), such as 1.5 inch (38 mm). The ink stick body has a vertical dimension between the top and bottom surfaces of between approximately 0.8 and 1.6 inches (20–41 mm), such as 1.3 inches (34 mm). The lateral dimension of the ink stick feed channel is approximately 0.004 to 0.2 inches (0.1–5.0 mm) wider than the lateral dimension of the ink stick body. Thus, the ink stick body remains substantially upright in the feed channel.

The ink stick body has an outer perimeter that is substantially horizontal around the largest horizontal cross section of the ink stick body. In the ink stick embodiment illustrated in FIG. 4 in which the side surfaces are substantially vertical, the outer perimeter is substantially uniform from the bottom surface to the top surface of the ink stick body. In the ink stick embodiment illustrated in FIG. 5, the horizontal outer perimeter substantially corresponds with the top surface 54 of the ink stick body. The outermost lateral side portions 56A of the ink stick body form longitudinal ink stick body perimeter segments that extend substantially parallel with the longitudinal feed direction of the feed channel when the ink stick is inserted into the feed channel. After considering the present disclosure, those skilled in the art will recognize that the outermost longitudinal segments of the perimeter can be in different positions along the height of the ink stick body. The perimeter longitudinal segment on one of the lateral side surfaces can even be at a different height than the perimeter longitudinal segment on the other lateral side surface.

The ink sticks shown in FIGS. 4 and 5 have a substantially horizontal cross-sectional shape, formed of the perimeter of the ink stick body as when the ink stick is viewed from above the top surface, corresponding to the shape of the keyed opening 24 of the corresponding feed channel for that particular color. The ink stick body includes a key element 70 of a particular predetermined size, shape, and location on the outer perimeter of the ink stick body. In the particular examples illustrated, the ink stick key element 70 is formed in the longitudinal perimeter segment formed by the outermost portion of the lateral side surface. For an ink stick of a particular color, the ink stick, key element 70 matches a complementary key, such as the exemplary key. 72A formed in the perimeter of the keyed opening 24A in the key plate. Each color for a printer has a unique arrangement of one or more key elements in the outer perimeter of the ink stick to form a unique cross-sectional shape for that particular color ink stick. The combination of the keyed openings 24A–24D in the key plate 26 and the keyed shapes of the ink sticks 30 (formed by the key elements 70) insure that only ink sticks of the proper color are inserted into each feed channel. A set of ink sticks is formed of an ink stick of each color, with a unique key arrangement for ink sticks of each color.

In the ink stick embodiments shown in FIGS. 4 and 5, the key element 70 is a vertical recess or notch formed in one of the lateral side surfaces 56 of the ink stick body. The corresponding complementary key on the perimeter of the keyed opening is a complementary protrusion into the opening. An inwardly directed key element, such as a notch, in the ink stick body provides improved ability to exclude incorrect ink sticks. Only an ink stick with a recess of that particular shape, location, and size (or larger) will fit through the keyed opening in the key plate having a key consisting of a corresponding protrusion from the edge of the keyed opening. In addition, a recessed key element on the ink stick body allows much of the lateral side surfaces. 56 of the ink stick body to be substantially flat. In particular, the sections of the lateral side surfaces 56 adjacent the corners with the end surfaces 61, 62 of the ink stick body can be flush with one another, and be the outermost lateral portions of the lateral side surface. The outermost lateral portions of the lateral side surfaces are the portions that tend to interact with the side walls of the feed channel that form the feed channel. Having the end sections of the lateral side surfaces as the outermost portions of the ink stick provides balanced sections that help the ink stick retain its proper orientation as the ink stick moves through the feed channel. The key element extends at least approximately 0.16 inch (4 mm) into the ink stick body.

In the embodiment illustrated in FIG. 4, with a substantially flat lateral side surface extending from the bottom surface to the top surface, the key element 70 extends along the entire height of the lateral surface. The ink stick can pass through the keyed opening having a protrusion at a corresponding position of the keyed opening. The embodiment of FIG. 5 has the key element extend only along the portion of the lateral side surface 56A of the wider portion of the, ink stick. In this embodiment, the corresponding key 72A–72D on the keyed opening 24A–24D of the key plate 26 does not extend far enough into the opening to require that the key element 70 be included in the narrower portion of the ink stick body.

The key element 70 on the ink stick body has a particular position with respect to the other perimeter segment of the ink stick body. For example, the key element has a particular spatial relationship with respect to the edges at which the perimeter segment containing the key element intersects other perimeter segments of the ink stick body. In further particularity, the key element 70 on the side surface 56 has a particular position with other surfaces of the ink stick body, such as the end surfaces 61, 62. The ink stick key element is located a leading distance 74 from the leading end surface 61 of the ink stick body, and a trailing distance 76 from the trailing end surface 62 of the ink stick body. In the embodiments illustrated in FIGS. 4 and 5, the leading distance 74 is substantially greater than the trailing distance 76. For example, the leading distance may be three times the trailing distance.

Figure 6:
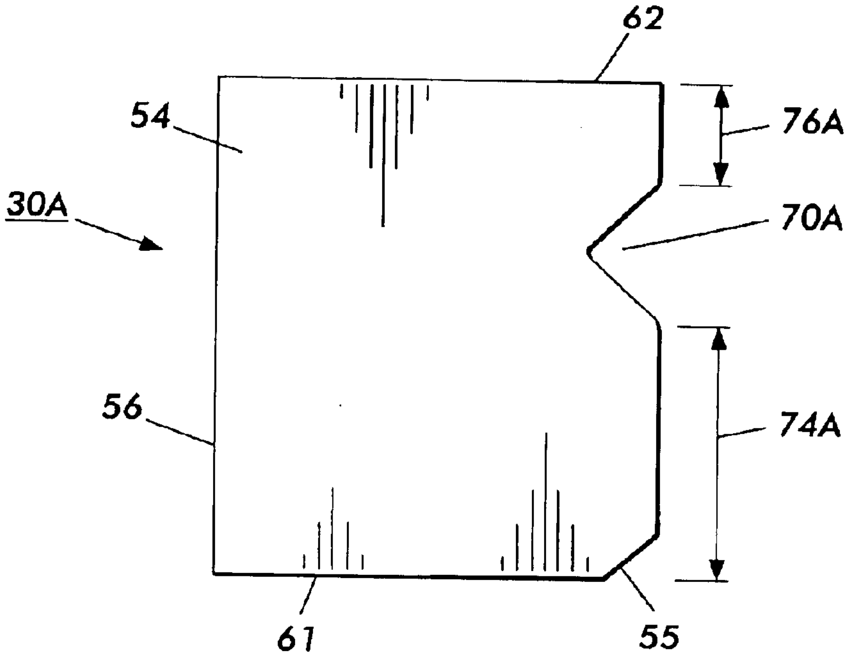
FIG. 6 is a top elevational view of the solid ink stick of FIG. 4.
Figure 7:
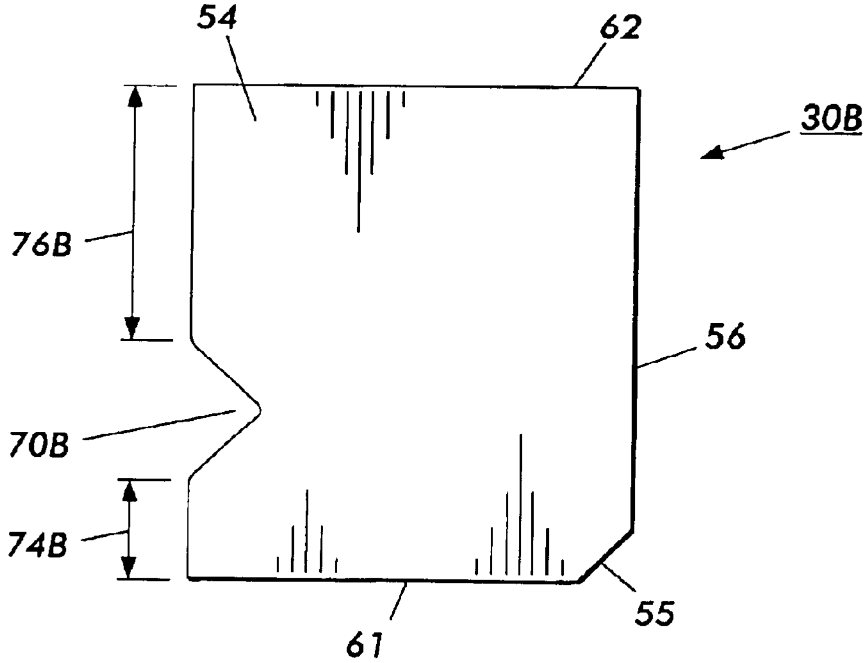
FIG. 7 is a top elevational view of another solid ink stick.
Figure 8:
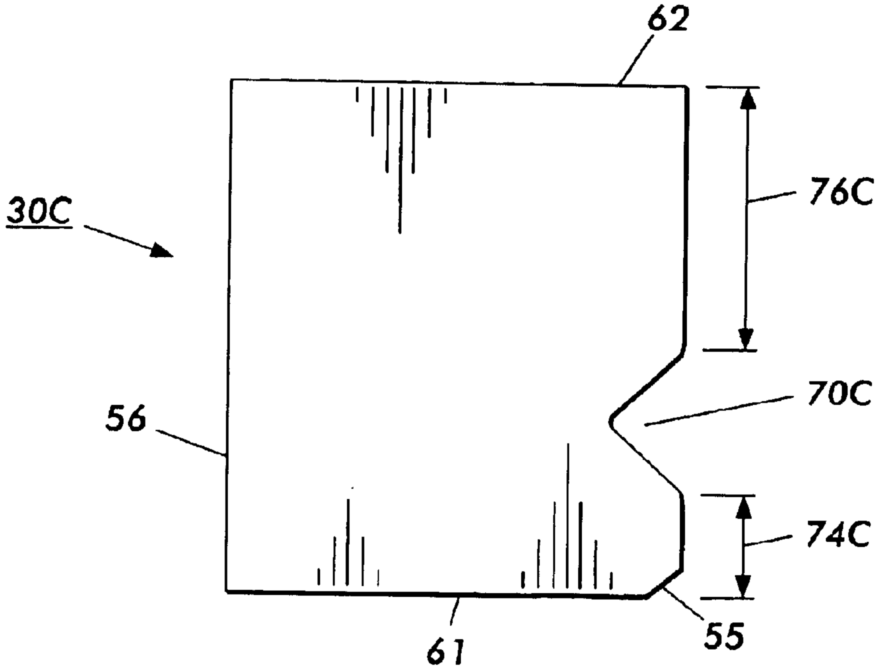
FIG. 8 is a top elevational view of another solid ink stick.
Figure 9:
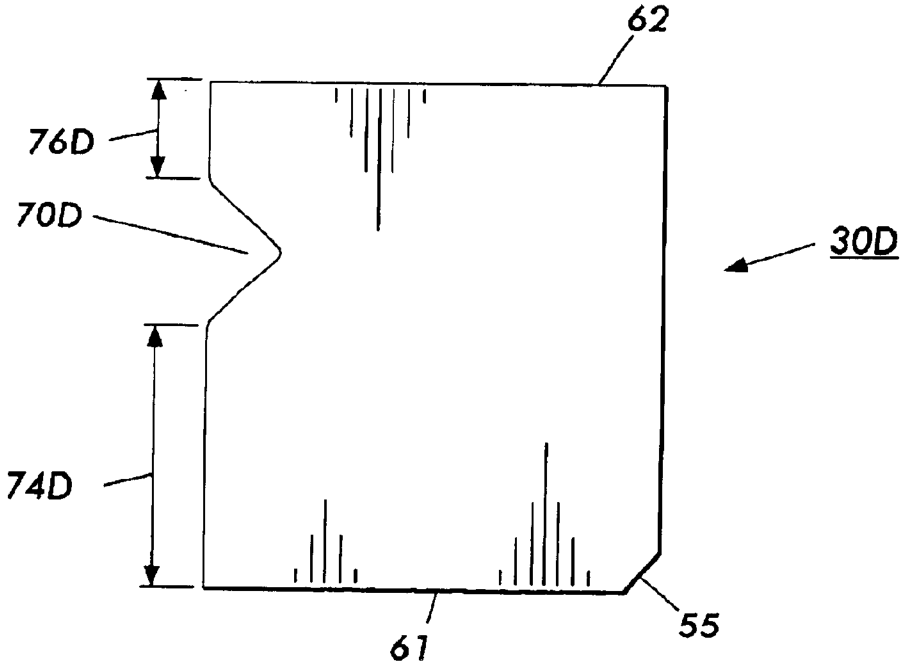
FIG. 9 is a top elevational view of another solid ink stick.

FIG. 6 is a top view of the ink stick of FIG. 4. A top view of the ink stick of FIG. 5 is identical. FIGS. 7, 8, and 9 are top views of ink sticks that may be included in a multi-color set of ink sticks for use in the printer shown in FIGS. 1–3. As can be seen by comparing ink stick shapes of FIGS. 6, 7, 8, and 9 with the keyed openings 24 of the key plate visible in FIG. 2, a set of ink sticks provides a unique one-to-one match between a particular color ink stick and the keyed openings providing access to the four ink stick feed channels. Such one-to-one match is provided by including a key element 70 of a single predetermined size and shape at different locations around the outer perimeter, of the ink stick body. For example, an ink stick with the key element 70A positioned as shown in FIG. 6 can be inserted into the first keyed opening 24A in the key plate shown in FIG. 2, but cannot be inserted into any of the other keyed openings 24B, 24C, 24D. The keys 72B, 72C, 72D in the keyed openings 24B, 24C, 24D of the key plate and corresponding to the key element positions shown in the ink sticks 30B, 30C, 36D of FIGS. 7, 8, and 9 will block the ink stick 30A of FIG. 6. The ink stick 3DB having the key element 70B positioned as shown in FIG. 7 can be inserted into the second keyed opening 24B of the key plate shown in FIG. 2, but not into the other keyed openings 24A, 24C, 24D. The ink sticks having the key elements 70C, 70D positioned as shown in FIGS. 8 and 9 (respectively) can be inserted into and only into the third and fourth key openings 24C, 24D, which correspond to the third and fourth ink stick feed channels. Thus, the key elements 70A, 70B, 70C, 70D provide discrimination among the different feed channels to stop the user from inserting an ink stick into the incorrect ink stick feed channel.

The key elements 70A, 70B, 70C, 70D are of substantially the same size and shape as one another, but are in different positions around the perimeter of the ink stick body. The key element 70C in the third ink stick 30C is formed in the same lateral side surface 56 as the key element 70A in the first ink stick 30A. But, the leading distance 74C from the leading end surface 61 to the key element 70C of the third ink stick 30C is significantly greater than the trailing distance 76C from the key element 70C to the trailing end surface 62. For example, the ratio of the leading distance 74C to trailing distance 76C for the third ink stick 30C could be the inverse of the ratio of the leading distance 74A to trailing distance 76A for the first ink stick 30A. More than one key element 70 can be included on a side surface 56 of the ink stick body. In particular, at least some of the key elements are on different sides of the ink stick horizontal perimeter. Thus, the key element 70A of the first ink stick is on a first section of the perimeter, while the key element 70B of the second ink stick is on a second section of the perimeter. The first and second sections of the perimeter do not correspond or align with one another when the first and second ink sticks 30A, 30B are aligned with one another.

An orientation feature 55 in each ink stick is useful to prevent erroneous ink insertion when the key element patterns (size and position) are symmetrical. The orientation feature illustrated is a corner notch in each ink stick. Referring to FIGS. 6 and 7, the orientation feature prohibits incorrect insertion of the first ink stick 30A into the second keyed opening 24B if the leading distance 74A and trailing distance 76A of the first ink stick are the same as the trailing distance 76B and leading distance 74B of the second ink stick. Those skilled in the art will identify numerous other types and configurations of features to ensure that ink sticks are inserted into the key opening with the correct orientation. For example, the orientation feature can be provided by positioning the key elements 70 so that the leading and trailing distances on different ones of the ink sticks are not symmetrical. Referring to the ink sticks shown in FIGS. 6 and 7, the orientation feature can be provided by having the leading distance 74A of the first ink stick 30A a different length than the trailing distance 76B of the second ink stick 30B and the trailing distance 76A of the first ink stick 30A a different length than the leading distance 74B of the second ink stick 30B.

In an alternative, the orientation feature can be provided, by a nesting feature in which a protruding element from the leading end surface 61 of one ink stick nests with a recessed element in the trailing end surface 62 of an adjacent ink stick, as described in U.S. patent application Ser. No.

10/135,089, entitled Ink Stick with Alignment Feature, filed Apr. 29, 2002 by inventors Brent Jones, et al. (Assignee's Attorney Docket No. D/A1673), the contents of which are hereby incorporated by reference.

The common shape and size of the key elements for the ink sticks of a particular set of ink sticks for a printer facilitates manufacture of the ink sticks, and enhances the "family" appearance of the set of ink sticks for that particular printer. Different shapes and/or sizes of key elements can be used to differentiate ink sticks intended for different models of printers. For example, one printer could use triangular ink stick key elements 70. A different printer model could use semicircular ink stick key elements (not shown). Yet a different printer model could use rectangular ink stick key elements (not shown). The ink stick key elements need not all be formed in the longitudinal perimeter segments formed on the lateral side surfaces of the ink stick body. Key elements can also be formed in perimeter segments of the ink stick body that are at least partially transverse longitudinal feed direction. For example, key elements can be formed in the perimeter segments formed by the outermost portions of the end surfaces 61, 62 of the ink stick body.

The ink stick body can have a number of sides other than four. For example, the ink stick body can be formed with three, five, or virtually any number of side surfaces. These side surfaces need not be equal in length, nor is the ink stick body necessarily symmetrical about the lateral or vertical centers of gravity. In other shapes, the ink stick body can have surfaces that are curved. For example, the ink stick body can have a cylindrical shape, with the axis of the cylinder parallel the longitudinal feed direction of the feed channel, parallel the lateral dimension of the feed channel, or perpendicular to both the longitudinal feed direction and the lateral dimension (vertical).

The ink stick body can also be formed in shapes other than a cubic rectangle. For example, the ink stick can have an elliptical horizontal cross sectional shape, a shape having multiple straight linear sides, or even a combination of curved and linear sides.

Figure 10:
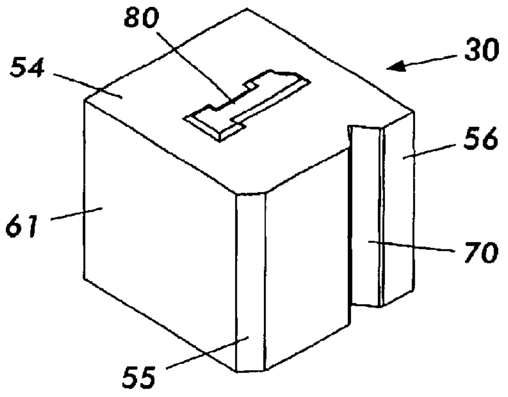
FIG. 10 is a perspective view of another embodiment of a solid ink stick.
Figure 11:
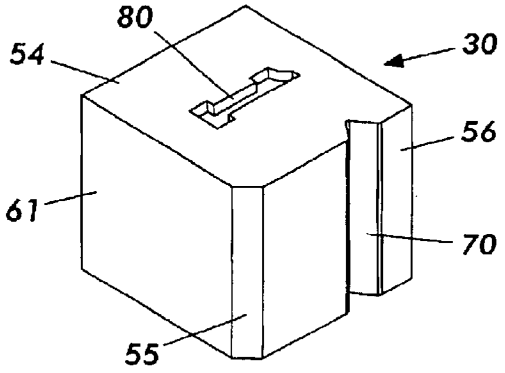
FIG. 11 is a perspective view of another embodiment of a solid ink stick.
Figure 12:
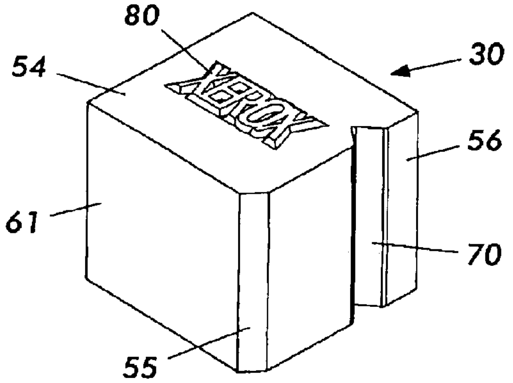
FIG. 12 is a perspective view of another embodiment of a solid ink stick.
Figure 13:
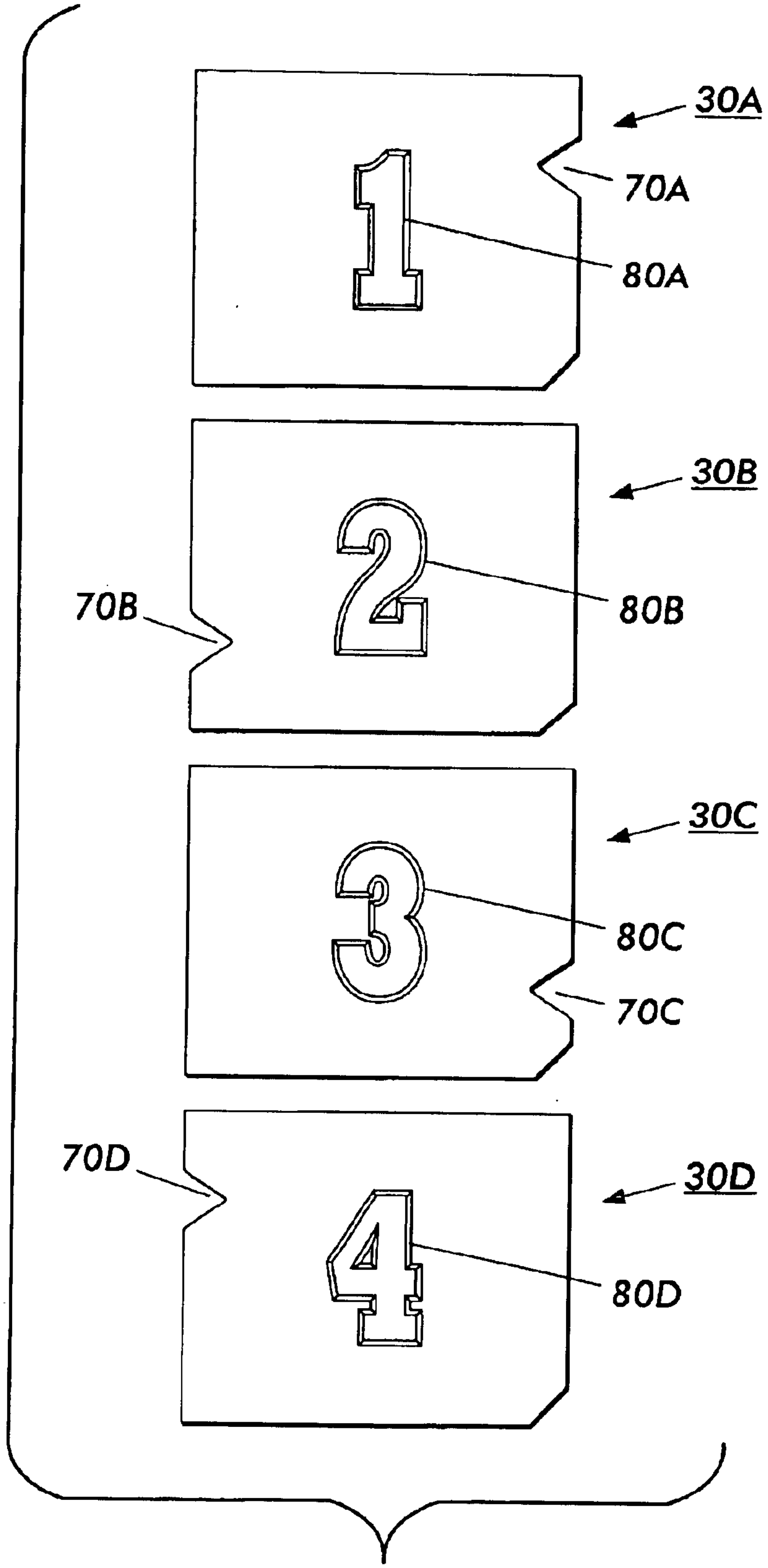
FIG. 13 is a top elevational view of a set of solid ink sticks.

An additional feature that reduces the possibility of incorrectly inserting an ink stick of one color into the feed channel intended for a different color is to include a visually recognizable symbol or mark 80 on the substantially horizontal top surface 54 of the ink block, as shown in FIGS. 10, 11, and 12. A visually recognizable symbol is a mark that conveys meaning to, or is easily recognizable by, a printer user. For maximum visibility, the visually recognizable symbol 80 is formed on the surface of the ink stick body with a vertical dimension, so that it is seen as three dimensional to the user. For example, the symbol 80 can be raised or embossed on the top surface, as shown in FIG. 10. The symbol could alternatively be impressed or debossed into the horizontal top surface of the ink stick block, as shown in FIG. 11. Referring to FIG. 13, a set of ink sticks for the printer shown in FIGS. 1–3 has the ink stick of the appropriate color identified with an alphanumeric character 80A, 80B, 80C, 80D corresponding to the particular keyed opening 24A, 24B, 24C, 24D leading to the appropriate feed channel for that particular color of ink. The visually recognizable symbol 80 on the ink stick can match the visually recognizable symbol 23 adjacent the corresponding keyed opening. An ink stick 30A with a key element 70A as shown in FIG. 6 for fitting through the first keyed opening 24A of the key plate is marked with, for example, the visually recognizable numeral "1." An ink stick 30B with a key element 70B as shown in FIG. 7 for fitting through the second keyed opening 24B of the key plate is marked with the visually recognizable numeral "2." Ink sticks 30C, 30D with key elements 70C, 70D as shown in FIGS. 8 and 9 for fitting through the third and fourth keyed openings 24C, 24D of the key plate are marked with the visually recognizable numerals "3" and "4" respectively. Alternatively, the three dimensional visually recognizable symbol 80 could be a letter indicating the color of the ink stick (i.e., "C" for cyan, "M" for magenta, "Y" for yellow, and "K" for black). Other symbols that convey meaning or can be matched with symbols can be used. For distinguishing among feed channels (and their corresponding keyed openings), in some instances only a portion of the symbol need differ between ink sticks of an ink stick set. The visually recognizable symbol 80 can be formed on any of the surfaces of the ink stick body if the visually recognizable symbol is formed on the top surface 54 of the ink stick body, the symbol aids the user in orienting the ink for insertion through the insertion keyed openings, and remains visible to the printer user as the user inserts the ink stick through the opening 24 of the key plate 26. More than one symbol may be desired on each ink stick. For example, an alphanumeric logo could further increase the ease of correctly orienting the ink stick for insertion through the opening 24.

FIG. 12 shows that additional information besides the identification of the correct ink stick keyed opening can be provided on one or more of the surfaces of the ink stick body. An example is shown in which the visually recognizable symbol or mark 80 comprises the brand name of the ink sticks, which is formed in the substantially horizontal upper surface of the ink stick body. Visually recognizable characters are either embossed or debossed in the ink stick body surface to provide a three dimensional presentation of information. Visually recognizable symbols that convey meaning, such as alphanumeric characters, can provide a variety of information, such as the printer model for which the ink sticks are intended, or additional color information. Such symbols reduce the likelihood of a printer user inserting ink sticks into the incorrect model printer.

Figure 14:
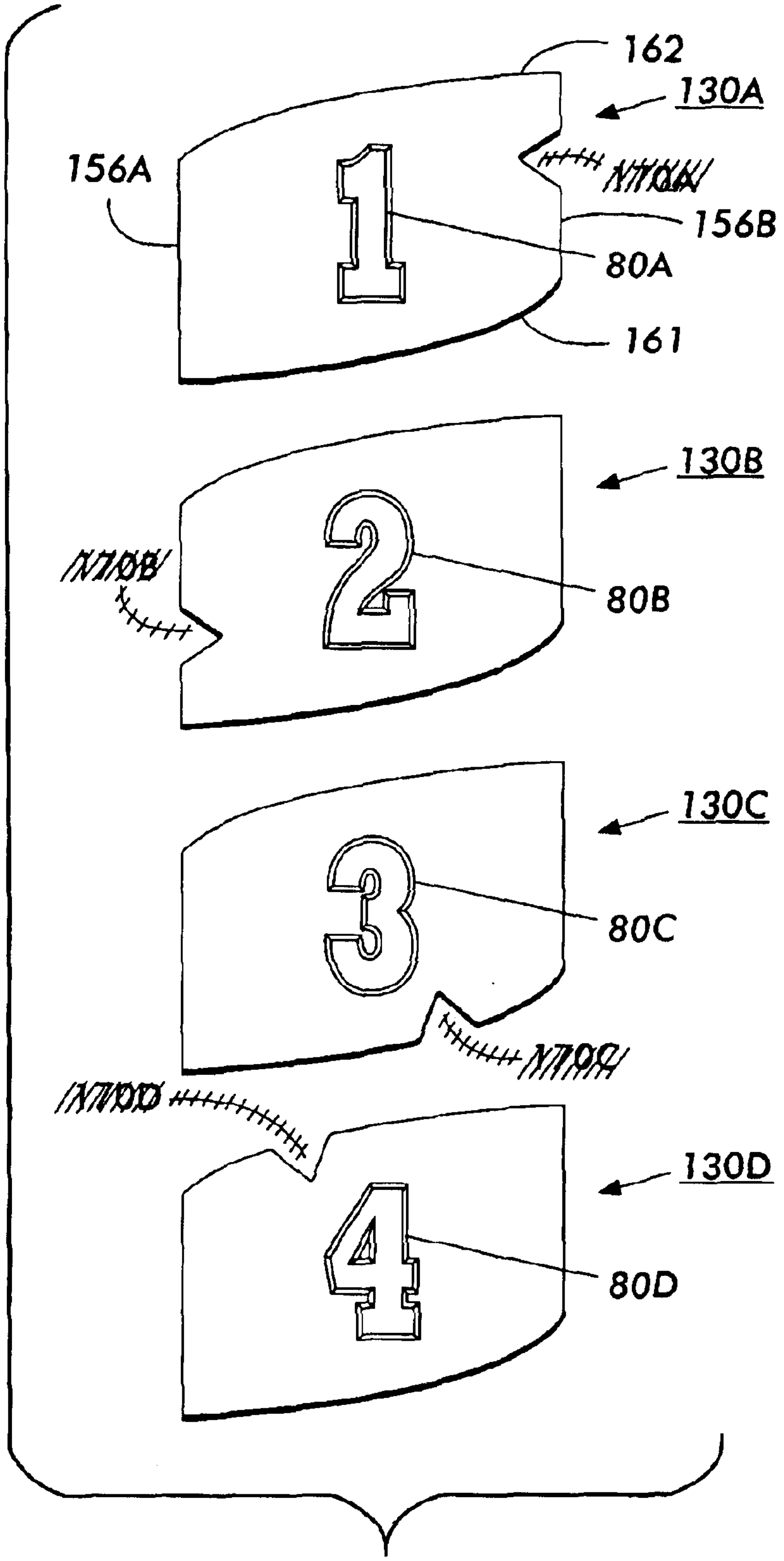
FIG. 14 is a top elevational view of another set of solid ink sticks.

As seen in FIG. 14, ink sticks can have shapes other than rectangular. The particular variation illustrated, each ink stick 130 has a pair of substantially flat lateral side surfaces 156 that curve into curved end surfaces 161, 162 to provide a "pillow" shape. In an alternative, the end surfaces could be substantially flat, with curved lateral side surfaces. Of course, the ink sticks can be formed in numerous other shapes with different numbers of side surfaces, and various combinations of curved and flat surfaces.

Those skilled in the art will recognize that corners and edges may have radii or other non-sharp configurations, depending on various factors, including manufacturing considerations. Those skilled in the art, upon reading this description will recognize that a variety of modifications may be made to the shapes of the ink sticks, including the shapes and configurations of the nesting elements, without departing from the spirit of the present invention. For example, different numbers of nesting elements can be included on the end surfaces of the ink sticks. The ink sticks can have non-cubic shapes. In certain circumstances, the nesting elements need not constrain vertical movement of the ink sticks relative one another. A substantial portion, or all, of the end surfaces of the ink sticks can be used to provide the nesting shapes for the ink sticks. In addition, the visually recognizable symbol can be any of a variety of shapes, such as animals, playing card symbols, model numbers, etc. Therefore, the following claims are not limited to the specific embodiments described and shown above.

We claim:

1. A set of ink sticks for use in a solid ink feed system of a phase change ink jet printer, wherein the solid ink feed system has a plurality of feed channels, each feed channel identified with a different visually recognizable symbol, the set of ink sticks comprising:

a plurality of ink sticks;

wherein each of the ink sticks comprises;

an ink stick body having a plurality of side surfaces and a general top surface substantially perpendicular to each of the side surfaces; and a visually recognizable symbol formed on the top surface of the ink stick and corresponding to one of the visually recognizable symbols that identifies one of the feed channels; and wherein the visually recognizable symbol on the top surface encompasses less than all of the top surface;

wherein at least a portion of each of the ink stick visually recognizable symbols has a vertical dimension relative to another portion of the top surface;

wherein a first one of the ink sticks has a first visually recognizable symbol;

wherein a second one of the ink sticks has a second visually recognizable symbol;

wherein the second visually recognizable symbol is different from the first visually recognizable symbol;

wherein a third one of the ink sticks has a third visually recognizable symbol;

wherein a fourth one of the ink sticks has a fourth visually recognizable symbol;

wherein the first, second, third, and fourth visually recognizable symbols form a pattern of symbols; and wherein the first, second, third, and fourth visually recognizable symbols are first, second, third, and fourth consecutive alphanumeric characters.

2. A solid ink feed system for a phase change ink jet printer, the solid ink feed system comprising:

a plurality of longitudinal feed channels, each identified by a unique feed channel visually recognizable symbol, wherein the feed channel visually recognizable symbols collectively form a pattern of visually recognizable symbols;

a plurality of openings, each providing access to one of the longitudinal feed channels; and a plurality of ink sticks, each having a planar surface;

a first visually recognizable symbol formed on the planar surface of a first of the ink sticks;

wherein the first visually recognizable symbol corresponds to one of the feed channel visually recognizable symbols; and wherein the first visually recognizable symbol has a dimension substantially perpendicular to the surface of the planar surface; and a second visually recognizable symbol formed on the planar surface of a second of the ink sticks;

wherein the second visually recognizable symbol corresponds to another of the feed channel visually recognizable symbols; and wherein the second visually recognizable symbol has a dimension substantially perpendicular to the surface of the planar surface;

wherein the pattern of recognizable symbols is a pattern of alphanumeric characters; and wherein the pattern of alphanumeric characters is a series of letters, wherein each letter is the first letter of a name of a type of ink intended for the associated feed channel.

3. A method of inserting ink into a solid ink feed system of a phase change ink jet printer, wherein the solid ink feed system comprises a plurality of feed channels, the method comprising:

providing an ink stick having a plurality of side surfaces and a top surface substantially perpendicular to each of the side surfaces;

identifying a visually recognizable symbol formed in the top surface of the ink stick;

wherein the visually recognizable symbol encompasses less than the entire top surface of the ink stick; and wherein the visually recognizable symbol has a vertical dimension relative to another portion of the top surface;

determining if the visually recognizable symbol matches any symbols of a pattern of visually recognizable symbols, wherein each symbol of the pattern corresponds to one of the feed channels of the solid ink feed system; and if the ink stick visually recognizable symbol matches one of the feed channel visually recognizable symbols, inserting the ink stick into the corresponding feed channel;

wherein determining if the ink stick visually recognizable symbol matches any symbols of a pattern of visually recognizable symbols comprises determining if the ink stick visually recognizable symbol matches any of a sequence of four consecutive alphanumeric characters, wherein each of the four consecutive alphanumeric characters corresponds to one of the feed channels of the solid ink teed system.

* * * * *